United States Patent Office 3,819,593
Patented June 25, 1974

3,819,593
HYDROXYETHYLMETHYLCELLULOSE AS A PROTECTIVE COLLOID IN VINYLACETATE EMULSION POLYMERIZATION
Ronald L. Glomski, Midland, Mich., and Allen H. Jones, Jr., Richardson, Tex., assignors to The Dow Chemical Company, Midland, Mich.
No Drawing. Filed May 11, 1973, Ser. No. 359,180
Int. Cl. C08f 3/56, 15/20
U.S. Cl. 260—86.1 E          5 Claims

ABSTRACT OF THE DISCLOSURE

An improvement in the process for preparing vinyl acetate polymers in aqueous emulsion comprising the use of hydroxyethylmethylcellulose having a thermal gel point greater than 100° C., a hydroxyethyl MS of from about 0.85–3.5, a methoxyl DS of from about 0.4–1.6 and a viscosity at 20° C. of from about 2 to 200 cps., as a protective colloid in the emulsion polymerization reaction.

BACKGROUND OF THE INVENTION

It is known that vinyl acetate monomer can be polymerized in aqueous emulsion in the presence of natural and synthetic water-soluble polymers which function as protective colloids in the polymerization process to provide products of desired particle size. Exemplary of such prior known protective colloids is hydroxyethylcellulose (HEC). This material, due to its hydrophilic nature, produces polymeric latexes of small particle size and good water resistant properties but with marginal freeze-thaw characteristics.

The water resistant properties of HEC are attributed to the ability of such material to become coordinated with the growing polymer chain. As the colloid becomes coordinated with the polymer chain, the relative surfactant action of such material increases thereby producing small latex particles. The freeze-thaw instability associated with the use of such colloids is due to the coalescing of the latex solids. It is an object of the present invention to provide, in the aqueous emulsion polymerization of vinyl acetate monomer, a protective colloid having reduced tendency to coordinate with the polymer chain and which will provide enhanced freeze-thaw stability without substantial reduction in latex water resistance. It is a further object to provide a means of obtaining a latex paint by the emulsion polymerization of vinyl acetate monomer, which paint is characterized by having improved enzyme stability along with improved flow and leveling properties without detriment to water resistance.

SUMMARY OF THE INVENTION

The above and related objects are obtained by utilizing as a protective colloid in the aqueous emulsion polymerization of vinyl acetate monomer, of from about 0.05 to about 5 percent based on monomer weight, of a water-soluble hydroxyethylmethylcellulose having a thermal gel point greater than 100° C., a hydroxyethyl MS of from about 0.85–3.5, a methoxyl DS of from about 0.4–1.6 and a viscosity at 20° C. of from about 2 to 200 cps.

DESCRIPTION OF THE PREFERRED EMBODIMENTS

The hydroxyethylmethylcellulose ethers utilized herein are ethers with a thermal gel point greater than about 100° C. and are inclusive of those materials as defined by U.S. Pat. No. 3,709,896 which have been shown to possess excellent enzyme stability in latex paint.

The terms "molar substitution" (MS) and "degree of substitution" (DS) are conventional terms describing substitution on the anhydroglucose units of the cellulose chain.

The ethers are prepared by reacting methyl chloride and ethylene oxide with alkali cellulose at about 40°–60° C. The alkali cellulose is prepared by treating cellulose with about 1.2–3.0 moles of 35–70% aqueous NaOH per mole cellulose at about room temperature. A dip tank as described in Savage U.S. Pat. 2,949,452, a spray mixer as described by Erickson U.S. Pat. 2,469,764, or a slurry reactor as described by Haskins, e.g., U.S. Pat. 2,131,733 are suitable. Contact with air is minimized to reduce viscosity loss.

Etherification is carried out in a pressure reactor in the absence of air at about 40–60° C. Because of the greater reactivity of the ethylene oxide, the reactor is generally charged with the major proportion of the methyl chloride at room temperature, heated to about 40°–50° C., and then the ethylene oxide added at a rate to maintain the desired temperature. However, incremental additions of methyl chloride and ethylene oxide can also be used. Normally, a total of about 1.0–6.0 moles of methyl chloride and about 3.4–7.0 moles of ethylene oxide are charged per mole of cellulose.

Careful control of the exothermic etherification is necessary to minimize irregular and uneven substitution. To maintain a temperature of about 40°–60° C., external cooling means are employed. Excess methyl chloride can be used as a heat transfer and ebullient cooling agent. Other ebullient diluents such as dimethyl ether or a water-soluble organic liquid such as isopropanol or tertiary butanol can also be used to provide more effective heat transfer and moderate the rate of etherification.

When the exothermic hydroxyethylation is completed, the reaction can be finished at 55–80° C. Without harm. The overall reaction time may be 4–12 hours. Then the reactor is vented, excess caustic is neutralized, and the product purified by appropriate means.

Since the hydroxyethylmethylcellulose ethers are water-soluble but nonthermal gelling below 100° C., the by-products are removed by washing with appropriate organic solvents or limited amounts of aqueous salt solutions. Particularly useful in minimizing the loss of the water-soluble product is the glyoxal insolubilization process described in U.S. Pats. 3,347,847 and 3,527,751. After purification, the product can be dried, granulated, ground, surface-treated, or otherwise prepared for storage and end use.

As described herein, the prescribed hydroxyethylmethylcellulose ethers are particularly effective as protective colloids for the polymerization of vinyl acetate monomer or mixtures of predominate amounts of monomeric vinyl acetate with one or more other monoethylenically unsaturated monomers. Exemplary of particularly preferred other such monomeric materials which may be copolymerized with predominant amounts of vinyl acetate according to the process of the present invention are the acrylates and methacrylates including the methyl, ethyl, propyl, butyl and 2-ethylhexyl acrylates and methacrylates. Other monomers which may be advantageously polymerized or interpolymerized according to the process of this invention are vinyl propionate, the vinyl and vinylidene halides such as vinyl chloride and vinylidene chloride, acrylonitrile and methacrylonitrile.

Obtainment of desired polymer particle size may be realized utilizing the prescribed cellulose ethers in a concentration ranging generally from about 0.05 to 5 percent based on the weight of monomer.

The choice of viscosity will depend upon the system used. For preparation of polyvinyl acetate and copolymers of vinyl acetate with an acrylate, e.g., 2-ethylhexylacrylate, a range of products with viscosities from about 2 to about 200 cps. at 20° C. are advantageously employed.

The following examples further illustrate the present invention and its advantages. Unless otherwise specified all parts and percentages are by weight.

EXAMPLE 1

(A) Preparation of Hydroxyethylmethylcellulose

The following materials were reacted as described below, in a 55 cubic foot roller blender reactor:

| Material | Conc., percent | Mole ratio | Weight (lbs.) |
|---|---|---|---|
| Alkali cellulose | | 1.0 | 160 |
| NaOH | 50 | 1.97 | 155 |
| Methyl chloride | | 5.95 | 300 |
| Ethylene oxide | | 4.55 | 200 |
| Citric acid | 50 | | 80 |
| Glyoxal | 40 | | 20 |

Alkali cellulose, prepared from the reaction of cellulose with sodium hydroxide, was degraded in the reactor for 2½ hours at 70° C. The reactor was then cooled to 35° C., evacuated and methyl chloride added. The reactor was then heated to 45° C. over a period of 1 hour after which time ethylene oxide addition began. During the hydroxyethylation reaction the temperature was maintained at 45° C. with an ethylene oxide addition rate of 2.5 pounds per minute. The reaction was continued until the residual alkali was present at a 2% concentration. The reactor was then vented. After venting, the reactor was cooled to 35° C. and evacuated. Citric acid was added to achieve a pH of 5. The glyoxal was then added and the reactor heated to 80° C. until residual moisture content was about 20%. The reactor was then vented and emptied. The crude product was washed with water (3:1 ratio of water to solids). The purified product was dried to 5% moisture and ground.

(B) Preparation of emulsion polymerization of vinyl acetate

The following is a typical formulation for the preparation of an emulsion polymerizate of vinyl acetate monomer:

| Ingredient | Amount (gms.) | Percent by weight of emulsion |
|---|---|---|
| Deionized water | 455.9 | 45.7 |
| Protective colloid | 12.5 | [1] 1.25 |
| Sodium bicarbonate (buffer) | 2.0 | 0.20 |
| Ammonium persulfate (initiator) | 2.0 | 0.20 |
| Non-ionic surfactant (Igepal CO-897, 70% sol'n.) | 14.3 | 1.43 |
| Surfactant (Dowfax 2A1) | 10.8 | 1.08 |
| Monomer | 500.0 | 50.13 |

[1] 2.5% based on monomer weight.

The protective colloid and water were charged to a 3-necked 2-liter flask. To render the water dispersible colloid soluble, ammonium hydroxide was added (1-2 drops). Once complete solution of colloid was attained, the surfactant, buffer and initiator were blended in. The solution was then mixed for approximately 10 minutes, and placed in a 68° C. water bath. The reaction flask was equipped with a variable speed electric motor for agitation control, condenser and an addition tube leading from the monomer reservoir through a syringe pump. The syringe pump was calibrated to deliver the monomer continuously over a 2-hour period. Agitation of the emulsion was fast enough to avoid any surface pooling of monomer. Proper agitation also determines the original distribution of monomer between the droplets and micelles and maintains adequate heat transfer during the initial exotherm. As the monomer addition took place, the immersion temperature increased to 72–75° C. After the 2-hour addition time, the batch temperature was raised to 95° C. over a 30-minute period and maintained for 30 minutes to reduce residual monomer to less than 1%. The emulsion was then cooled to room temperature and poured through a 60-mesh screen into a suitable container. The insolubles retained on the screen were then recorded as coagulum.

(C) Latex Testing Procedures and Results

In each of a series of experiments, an aqueous emulsion polymerizate containing vinyl acetate monomer was tested as follows:

Freeze-Thaw Stability.—Two hundred grams of the latex were placed in a resin lined half-pint paint can and put in the freezer for 24 hours at 0° C. The sample was removed and stored at room temperature for 8 hours. The cycle was repeated until total latex coagulation occurred or five cycles were completed.

Mechanical Stability.—Two hundred grams of latex were put on a Hamilton Beach milk shake mixer. The sample was run until coagulation occurred or for a total of 30 minutes. The material was then passed through a U.S. 40 mesh screen and the residual was collected and rated on a scale from 1–10 (1—trace amounts, 10—excessive insolubles 1–2 gm.).

Heat Stability.—One hundred grams of latex were put in a 4-ounce bottle, capped tightly and stored at 140° F. for one week. The samples were then evaluated for gelation and phase separation.

Coagulum.—The total latex system was poured through a 60 mesh screen and residual collected and reported as coagulum by the rating system applied as described above.

Percent Conversion.—A 10 gram sample of the finished latex was weighed into a tared aluminum pan. The sample was then dried in an oven at 200° F. to a constant weight.

$$\text{Percent conversion} = \frac{\text{Actual solids}}{\text{Theoretical solids}}$$

A percentage correction for percent conversion was taken into account for the coagulum already removed.

Viscosity.—Brookfield Model LVF was used with a number 3 spindle at 30 r.p.m. at room temperature.

Initial pH.—The pH of this finished latex was determined the day following preparation using a Sargent single electrode pH meter. For optimum emulsion stability, the pH should be between 4 and 5.

Film Properties.—(a) Clarity—Visual comparison as to haziness, fibers and insolubles in a film cast onto sheets of ethylcellulose.

(b) Adhesion—Comparison of the adhesive properties of the film on the ethylcellulose sheeting was done by slicing the film with a razor blade. The amount of pullaway from the sheeting was rated either excellent, good, fair or poor.

(c) Scrubability—A 10 mil (wet) film was cast on a polyvinyl chloride test sheet (Lenetie black plastic scrub panel). The film was allowed to dry for 48 hours at ambient temperature. Since the percent solids varied only slightly, no dry film thickness measurements were taken. The dried films were placed in a Gardner Heavy Duty Wear Tester. Ten grams of abrasive scrub media were added to a nylon brush which had been presoaked for 5 minutes in a 1% solution of Triton X–100. Five mils. of water were placed in the brush path and the scrubbing cycles started. After 400 cycles another 10 gms. of scrub media and 5 mls. of water were added. The first complete film break was taken as the end point.

Particle Size Determinations.—Latex samples were diluted with distilled water and treated with one drop of 1.0% Uranyl Acetate per 2 ml. of dilute latex. One drop sample was dried on a carbon coated substrate for examination and photomicrography. Results reported were number average particles size (microns, $\mu$) and distribution range of particle sizes.

The following Table I (Section A) sets forth properties obtained by utilization of a series of hydroxyethylmethylcellulose (HEMC) materials in the emulsion polymerization of vinyl acetate monomer to produce a polyvinyl acetate polymer latex; Section B of Table I sets forth comparative data using conventional hydroxyethylcellulose (HEC) materials as a protective colloid.

EXAMPLE 2

The Preparation of Paint Formulations from Vinyl Acetate Polymer Latexes Prepared in the Presence of a Protective Colloid The following represents a typical polyvinyl acetate (PVAc) paint formulation:

|  | Grams | Lgs./100 gal. |
|---|---|---|
| Water | 1,200 | 300 |
| Pigment dispersant (Daxad 30) | 24 | 6 |
| Potassium tripolyphosphate | 2 | .5 |
| Preservative (Dowicil 100) | 5 | 1.25 |
| Non-ionic surfactant (Igepal CO–630) | 16 | 4 |
| Ethylene glycol | 100 | 25 |
| Defoamer (Nopco NDW) | 8 | 2 |
| $TiO^2$ (Tripure 901) | 1,000 | 250 |
| Calcium carbonate (Snow Flake White) | 400 | 100 |
| Clay filler (ASP 400) | 500 | 125 |
| Above is known as the pigment grind | | |
| Coalescent (Texanol) | 64 | 16 |
| PVAc latex | 1,000 | 250 |
| 3% Aqueous solution of protective colloid | 380 | 95 |

TABLE I

| | A (the invention) | | | B (for comparison) | | | |
|---|---|---|---|---|---|---|---|
| Sample Nos. | 1 | 2 | 3 | 4 | 5 | 6 | 7 |
| Colloid viscosity | 40 cps | 40 cps.[1] | 48 cps | 19 cps | 19 cps | 14 cps | 13 cps. |
| Substitution | DS, .58; MS, 1.76 | DS, .58; MS, 1.76 | DS, .86; MS, 1.66 | MS, 2.5 | MS, 2.5 | MS, 1.8 | MS, 1.8. |
| Freeze-thaw | 5 cycles | 4 cycles | 3 cycles | 2 cycles | 2 cycles | 1 cycle | 2 cycles. |
| Mechanical stability | Insol., 5 | Insol., 1 | Insol., 6 | Insol., 1 | Insol., 2–3 | Insol., 1 | Insol., 5. |
| Heat stability | Good | Good | Good | Good | Good | Good | Good. |
| Coagulum | Insol., 3 | Insol., 1 | Insol., 4 | Insol., 1 | Insol., 3 | Insol., 1 | Insol., 3. |
| Percent conversion | 99.5 | 99.3 | 99.4 | 99.7 | 100 | 99.9 | 99.5. |
| Viscosity (cps.) | 452 | 1,360 | 470 | 925 | 320 | 356 | 180. |
| pH | 4.4 | 4.6 | 4.8 | 4.3 | 4.7 | 4.4 | 4.7. |
| Film clarity | Poor | Good | Poor | Good | Poor | Poor | Poor. |
| Scrub. data (cycles) | 58 | 39 | 24 | 59 | 25 | 50 | 12. |
| Particle size (microns) [range] | 0.8 | 0.5 | 0.6 | 0.4 | 0.5 | 0.5 | 0.4. |

[1] Dialyzed.

The foregoing data illustrate that significantly improved latex freeze-thaw stability is achieved using the HEMC protective colloids as compared to utilization of the conventional HEC protective colloids.

The following Table II sets forth properties obtained by utilization of a series of hydroxyethylmethylcellulose materials as protective colloids in the emulsion polymerization of a monomer mixture composed of 85 percent vinyl acetate and 15 percent 2-ethylhexyl acrylate.

The ingredients which make up the pigment grind were mixed on a Cowles® mixer at 4400 r.p.m. Texanol and a 3 percent solution of thickener were then added to the grind and mixed with low speed agitation. The resulting mixture was then added to the various PVAc latexes, mixed for 30 minutes and left for 24 hours for viscosity build. Viscosity and heavy duty scrubability properties were measured as described supra. Flow and leveling properties of the paint were determined by comparison

TABLE II

| Sample number | 8 | 9 | 10 | 11 | 12 | 13 |
|---|---|---|---|---|---|---|
| Colloid viscosity (cps.) | 40 | 40 (dialyzed) | 38.5 | 5.6 | 110 | 12. |
| Substitution | DS, 0.58; MS, 1.76 | DS, 0.58; MS, 1.76 | DS, .59; MS, 1.37 | DS, 1.2; MS, .85 | DS, .82; MS, 1.44 | DS, .76; MS, 1.33. |
| Freeze-thaw | 2 cycles | 4 cycles | 2 cycles | 4 cycles | 2 cycles | 1 cycle. |
| Mechanical stability | Insol., 5 | Insol., 3 | Insol., 6–7 | Insol., 10 | Insol., 9 | Insol., 7. |
| Heat stability | Good | Good | Good | Good | Good | Good. |
| Coagulum | Insol., 7 | Trace amounts | Insol., 10+++ | I sol., 5 | Insol., 3 | Insol., 10+. |
| Percent conversion | 99.1 | 99.6 | 99.5 | 99 | 99.1 | 98.8. |
| Viscosity (cps.) | 760 | 650 | 420 | 1,520 | 1,500 | 550. |
| pH | 4.7 | 4.5 | 4.8 | 4.4 | 4.8 | 4.4. |
| Film clarity | Good | Excellent | Good | Excellent | Excellent | Excellent. |
| Adhesion | Excellent | Excellent | Excellent | Excellent | Excellent | Excellent. |
| Scrub data | 215 | 274 | 86 | 111 | 132 | 159. |
| Particle size (microns) [range] | .7 (.3–1.2) | .6 (.2–1.1) | .4 (.1–1.1) | .3 (.1–.8) | .7 (.4–1.2) | .5 (.2–1.1). |

| Sample number | 14 | 15 | 16 | 17 | 18 |
|---|---|---|---|---|---|
| Colloid viscosity (cps.) | 2.6 | .87 | 200 | (8 megarads) | 37. |
| Substitution | DS, .8; MS, 2.89 | DS, 0.42; MS, 1.29 | DS, 0.8; MS, 1.93 | DS, .44; MS, 2.19 | DS, .48; MS, 1.99. |
| Freeze-thaw | 3 cycles | 3 cycles | 3 cycles | 5 cycles | 3 cycles. |
| Mechanical stability | Insol., 10 | Insol., 9 | Insol., 10 | Insol., 8 | Insol., 5. |
| Heat stability | Good | Good | Good | Good | Good. |
| Coagulum | Insol., 10+ | Insol., 4 | Insol., 10+++ | Insol., 6 | Insol., 5. |
| Percent conversion | 99.1 | 99.6 | 99 | 99.5 | 98.9. |
| Viscosity (cps.) | 400 | 1,000 | 920 | 840 | 1,070. |
| pH | 4.4 | 5.0 | 4.7 | 4.7 | 4.6. |
| Film clarity | Excellent | Excellent | Good | Good | Good. |
| Adhesion | Excellent | Excellent | Excellent | Excellent | Excellent. |
| Scrub. data | 101 | 109 | 148 | 170 | 181. |
| Particle size (microns) [range] | .3 (.15–.8) | .6 (.3–1.1) | .7 (.3–1.2) | .5 (.3–.9) | .5 (.3–1.0). | of paint "brush outs" with standards. To prepare "brush outs," 20 gms. of test paint were brushed onto a two foot square area and allowed to dry. The rating is 1 to 10 with 1 being the poorest and 10 the best.

The following Table III sets forth paint properties achieved using a series of protective colloids:

TABLE III

| Sample number | Type | Protective colloid substitution | | Visc. (cps.) | Visc. of paints (Kreb units) | Scrub data, days (cycles) | Flow and leveling rating [1] |
| --- | --- | --- | --- | --- | --- | --- | --- |
| | | DS | MS | | | | |
| For comparison: | | | | | | | |
| 19 | HEC | | 2.5 | 19 | 79 | 1,150 | 5 |
| 20 | HEC | | 1.8 | 13-14 | 83 | 1,111 | 5 |
| The invention: | | | | | | | |
| 21 | HEMC | .58 | 1.76 | 40 | 78 | 1,090 | 7 |
| 22 | HEMC (dialyzed) | .58 | 1.76 | 40 | 68 | 1,090 | 7 |
| 23 | HEMC | .42 | 1.29 | 8.7 | 70 | 1,020 | 6 |
| 24 | HEMC | .44 | 2.19 | 40 | 75 | 1,620 | 7 |

[1] 1=worst; 10=best.

The above data illustrate that polyvinyl acetate based paints, wherein hydroxyethylmethylcellulose (HEMC) (as prescribed by this invention) was used as the protective colloid in the polymerization of the vinyl acetate monomer, have equivalent or improved water resistance and improved flow and leveling properties as compared to polyvinyl acetate based paints containing the same amounts of conventionally used hydroxyethylcellulose (HEC) materials as the protective colloid.

What is claimed is:

1. In the process of polymerizing vinyl acetate monomer in aqueous emulsion in the presence of a protective colloid the improvement consisting of using as said protective colloid from about 0.05 to 5 percent based on monomer weight of a water-soluble hydroxyethylmethylcellulose ether having a thermal gel point greater than 100° C., a hydroxyethyl MS of about 0.85–3.5, a methoxyl DS of about 0.4–1.6 and a viscosity at 20° C. of from about 2 to 200 cps.

2. The process of Claim 1 wherein said monomer is a mixture of predominant amounts of vinyl acetate and correspondingly lesser amounts of a monoethylenically unsaturated comonomer.

3. The process of Claim 2 wherein said monoethylenically unsaturated comonomer is selected from the group consisting of methyl, ethyl, propyl, butyl and 2-ethylhexyl acrylates and methacrylates.

4. The process of Claim 3 wherein said monomer is a mixture of vinyl acetate and 2-ethylhexyl acrylate.

5. The process of Claim 4 wherein said monomer is a mixture of about 85 percent by weight vinyl acetate and about 15 percent by weight 2-ethylhexyl acrylate.

References Cited
UNITED STATES PATENTS

| 2,587,562 | 2/1952 | Wilson | 260—89.1 |
| 3,205,204 | 9/1965 | Heckmaier et al. | 260—92.8 W |

HARRY WONG JR., Primary Examiner

U.S. Cl. X.R.

260—85.5 N, 85.7, 87.5 R, 87.7, 88.7 F, 89.1, 91.7, 92.8 W